(12) United States Patent
Lau

(10) Patent No.: US 10,355,507 B2
(45) Date of Patent: Jul. 16, 2019

(54) INTELLIGENT REMOTE CONTROLLABLE BATTERY SYSTEM

(71) Applicant: Hak Wah Lau, HongKong (HK)

(72) Inventor: Hak Wah Lau, HongKong (HK)

(*) Notice: Subject to any disclaimer, the term of this patent is extended or adjusted under 35 U.S.C. 154(b) by 211 days.

(21) Appl. No.: 15/592,195

(22) Filed: May 11, 2017

(65) Prior Publication Data

US 2017/0366031 A1 Dec. 21, 2017

(30) Foreign Application Priority Data

Jun. 15, 2016 (HK) .................................... 16106864

(51) Int. Cl.
| | |
|---|---|
| *H01M 10/46* | (2006.01) |
| *H02J 7/00* | (2006.01) |
| *H01M 10/42* | (2006.01) |
| *H01M 10/44* | (2006.01) |
| *H01M 10/48* | (2006.01) |
| *H01M 10/6571* | (2014.01) |

(52) U.S. Cl.
CPC ......... *H02J 7/0068* (2013.01); *H01M 10/425* (2013.01); *H01M 10/4257* (2013.01); *H01M 10/44* (2013.01); *H01M 10/46* (2013.01); *H01M 10/486* (2013.01); *H01M 10/6571* (2015.04); *H02J 7/0029* (2013.01); *H02J 7/0047* (2013.01); *H01M 2010/4271* (2013.01); *H01M 2010/4278* (2013.01); *H02J 2007/004* (2013.01); *H02J 2007/0037* (2013.01); *H02J 2007/0096* (2013.01)

(58) Field of Classification Search
CPC ...... H02J 7/0029; H02J 7/0068; H02J 7/0047; H02J 2007/0096
USPC .................. 320/107, 114, 128, 134, 135, 136
See application file for complete search history.

(56) References Cited

U.S. PATENT DOCUMENTS 4,700,375 A * 10/1987 Reed ...................... H02J 7/0004
455/573
2017/0155526 A1* 6/2017 Li ........................ H01R 13/6675

* cited by examiner

*Primary Examiner* — Edward Tso
(74) *Attorney, Agent, or Firm* — W&K IP

(57) ABSTRACT

The disclosure relates to a novel intelligent remote controllable battery system, comprising a wireless signal reception/transmission module, a charging-discharging control module, a battery and a voltage input/output port, wherein the wireless signal reception/transmission module is electrically connected to the changing-discharging control module, wherein the battery, the charging-discharging control module and the voltage input/output port are electrically connected in sequence; wherein the wireless signal reception/transmission module is configured to receive a wireless control signal from an external remote control device, wherein the charging-discharging control module is configured to convert an output voltage of the battery to a voltage with specific specification based on the wireless control signal and output the voltage with specific specification to an external electric equipment through the voltage input/output port, and is further configured to convert an input voltage from an external power supply through the voltage input/output port to a specification-predetermined voltage for charging the battery.

9 Claims, 4 Drawing Sheets

INTELLIGENT REMOTE CONTROLLABLE BATTERY SYSTEM

TECHNICAL FIELD

The present invention relates to the field of battery, especially to a novel intelligent remote controllable battery system.

BACKGROUND OF THE DISCLOSURE

In the existing technology, few of rechargeable batteries are able to be wirelessly controlled, resulting in many inconvenient issues. Accordingly, the existing technology is defective and thus an improvement thereof is needed.

SUMMARY OF THE DISCLOSURE

Accordingly, one object of the present invention is to provide a novel intelligent remote controllable battery system.

In order to achieve the foregoing object, the novel intelligent remote controllable battery system provided by the present invention comprises a wireless signal reception/transmission module, a charging-discharging control module, a battery and a voltage input/output port, wherein the wireless signal reception/transmission module is electrically connected to the changing-discharging control module; wherein the battery is electrically connected to the charging-discharging control module; the charging-discharging control module is electrically connected to the voltage input/output port; the wireless signal reception/transmission module is configured to receive a wireless control signal from an external remote control device; the charging-discharging control module is configured to convert an output voltage of the battery to a voltage with specific specification based on the wireless control signal; the charging-discharging control module is configured to output the voltage with specific specification to an external electric equipment through the voltage input/output port; and the charging-discharging control module is further configured to convert an input voltage from an external power supply through the voltage input/output port to a specification-predetermined voltage for charging the battery.

The novel intelligent remote controllable battery system provided by the present invention, further comprises a battery protection module being electrically connected between the battery and the charging-discharging control module.

In the novel intelligent remote controllable battery system provided by the present invention, the battery protection module includes an overcharge protection unit, an overdischarge protection unit, a short-circuit protection unit and an over-temperature protection unit being connected in sequence.

In the novel intelligent remote controllable battery system provided by the present invention, the wireless signal reception/transmission module includes an antenna, a modulation-demodulation module and a data processing module which are connected in sequence, wherein the data processing module is connected to the charging-discharging control module.

The novel intelligent remote controllable battery system provided by the present invention, further comprises a speed sensor configured to sense the motion speed.

The novel intelligent remote controllable battery system provided by the present invention, further comprises a remote control, wherein the remote control is provided with a motion sensor, a processor and a wireless communication module being connected in sequence, wherein the processor transmits a motion data of the motion sensor to the wireless signal reception/transmission module through the wireless communication module, and the charging-discharging control module outputs an corresponding voltage to the external electric equipment based on the motion data.

In the novel intelligent remote controllable battery system provided by the present invention, the remote control is further provided with a display module; the charging-discharging control module is further configured to detect an electric consumption of the battery and transmit the electric consumption to the wireless communication module of the remote control through the wireless signal reception/transmission module, wherein the display module is configured to display the electric consumption.

The novel intelligent remote controllable battery system provided by the present invention, further comprises a temperature control module including a temperature sensor configured to a temperature of the battery, a heater configured to heat the battery, and a controller, wherein the temperature sensor and the heater is connected to the controller respectively.

The present invention further provides a novel intelligent remote controllable battery system, comprising a wireless signal reception/transmission module, a charging-discharging control module, a battery and a voltage input/output port, wherein the wireless signal reception/transmission module is electrically connected to the changing-discharging control module, wherein the battery, the charging-discharging control module and the voltage input/output port are electrically connected in sequence; the wireless signal reception/transmission module is configured to receive a wireless control signal from an external remote control device; the charging-discharging control module is configured to convert an output voltage of the battery to a voltage with specific specification based on the wireless control signal and output the voltage with specific specification to an external electric equipment through the voltage input/output port, and is further configured to convert an input voltage from an external power supply through the voltage input/output port to a specification-predetermined voltage for charging the battery.

The novel intelligent remote controllable battery system further comprises a battery protection module electrically connected between the battery and the charging-discharging control module, wherein the battery protection module includes an overcharge protection unit, an overdischarge protection unit, a short-circuit protection unit and an over-temperature protection unit being connected in sequence; wherein the wireless signal reception/transmission module includes an antenna, a modulation-demodulation module and a data processing module which are connected in sequence, wherein the data processing module is connected to the charging-discharging control module.

The novel intelligent remote controllable battery system further comprises wherein the remote control is provided with a motion sensor, a processor and a wireless communication module being connected in sequence, wherein the processor transmits a motion data of the motion sensor to the wireless signal reception/transmission module through the wireless communication module, and the charging-discharging control module outputs an corresponding voltage to the external electric equipment based on the motion data; wherein the remote control is further provided with a display module; the charging-discharging control module is further configured to detect an electric consumption of the battery and transmit the electric consumption to the wireless communication module of the remote control through the wireless signal reception/transmission module, wherein the display module is configured to display the electric consumption.

The novel intelligent remote controllable battery system provided by the present invention is provided with the wireless signal reception/transmission module for receipting the wireless control signal from the external remote device, then the charging-discharging control module thereof is configured to the output voltage of the battery to the voltage with specific specification based on the wireless control signal and outputting the voltage with specific specification to the external electric equipment through the voltage input/output port, and is further configured to convert an input voltage from an external power supply through the voltage input/output port to a specification-predetermined voltage for charging the battery. Accordingly, the novel intelligent remote controllable battery system is capable of being charged through wireless control, and the charging-discharging control module is wirelessly controlled to output the voltage with corresponding specification to the external electric equipment.

DETAILED DESCRIPTION OF THE INVENTION

For a better understanding of the aforementioned object and embodiments of the present invention as well as benefits thereof reference should be made to the Description of Embodiments below, in conjunction with the following drawings. It should be appreciated that the specific embodiments herein are described in order to best explain the principles of the present invention but not limit the invention.

Figure 1:
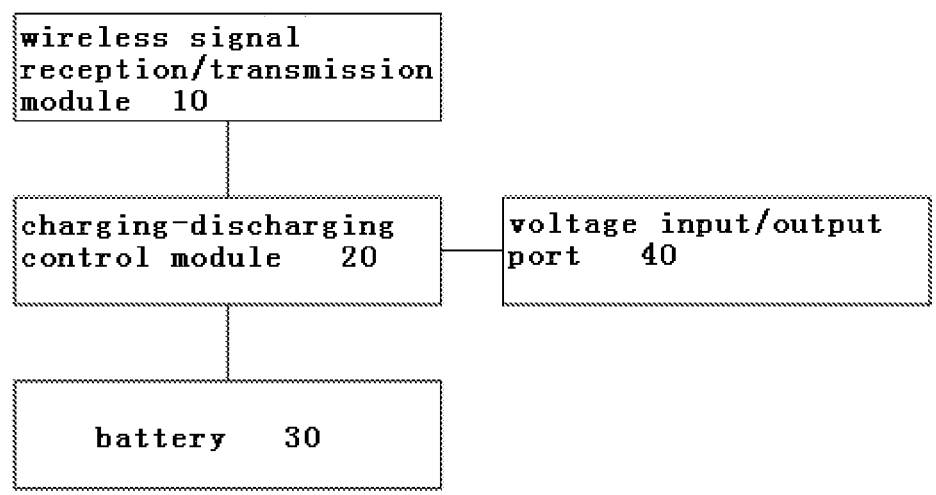
FIG. 1 is a schematic diagram of a novel intelligent remote controllable battery system according to a first embodiment of the present invention.

As shown in FIG. 1, the novel intelligent remote controllable battery system according to the first embodiment of the present invention is adapted for, without limitation, toy cars to achieve wireless control, it comprises a wireless signal reception/transmission module 10, a charging-discharging control module 20, a battery 30 and voltage input/output port 40, a wireless signal reception/transmission module 10, a battery 30 and a voltage input/output port 40, wherein the wireless signal reception/transmission module 10 is electrically connected to the changing-discharging control module 20; wherein the battery 30 is electrically connected to the charging-discharging control module 20; the charging-discharging control module 20 is electrically connected to the voltage input/output port 40; the wireless signal reception/transmission module 20 is configured to receive a wireless control signal from an external remote control device; the charging-discharging control module 20 is configured to convert an output voltage of the battery 30 to a voltage with specific specification based on the wireless control signal; the charging-discharging control module 20 is configured to output the voltage with specific specification to an external electric equipment through the voltage input/output port 40; and the charging-discharging control module 20 is further configured to convert an input voltage from an external power supply through the voltage input/output port to a specification-predetermined voltage for charging the battery 30.

More specifically, the charging-discharging control module 20 may use an integrated chip MP2131. Other ICs are also applicable. The wireless signal reception/transmission module 10 includes an antenna, a modulation-demodulation module and a data processing module which are connected in sequence, wherein the data processing module is connected to the charging-discharging control module 20.

The antenna is configured to receipt or transmit a radio signal, while the modulation-demodulation module is configured to demodulate the received radio signal or module a signal before transmitting it via the antenna. The data processing module is configured to performing signal processing on the signal. Surely, in the embodiment, the modulation-demodulation module and the data processing module may be integrated to a circuit chip, for example, WI-3009S.

Figure 2:
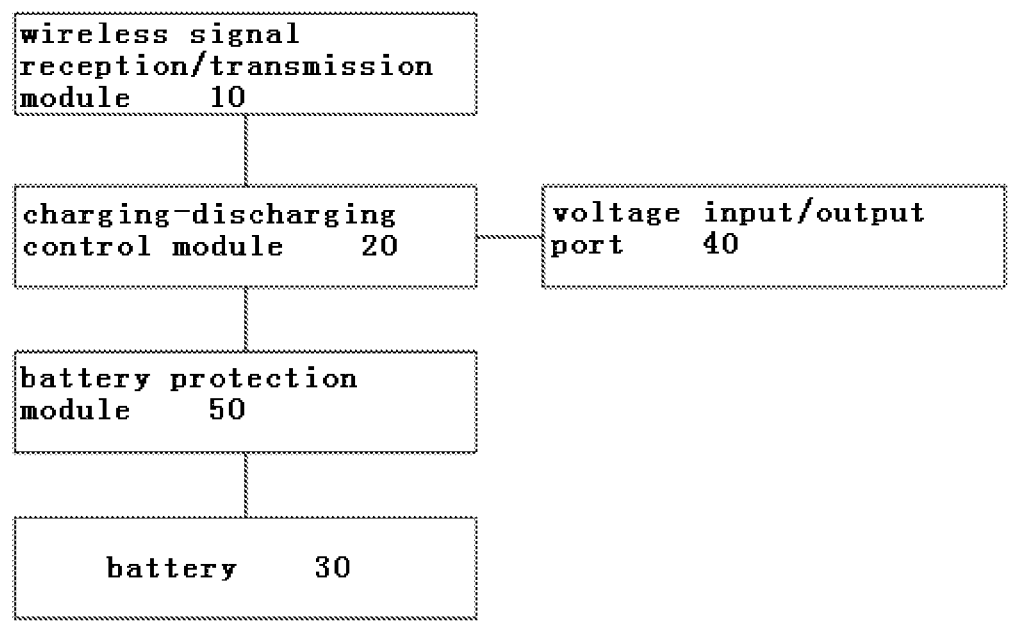
FIG. 2 is a schematic diagram of a novel intelligent remote controllable battery system according to a second embodiment of the present invention.

As shown in FIG. 2, in a second embodiment, the novel intelligent remote controllable battery system further comprises a battery protection module 50 being electrically connected between the battery 30 and the charging-discharging control module 20. The battery protection module 50 is configured to protect the battery. More specifically, the battery protection module 50 includes an overcharge protection unit, an overdischarge protection unit, a short-circuit protection unit and an over-temperature protection unit being connected in sequence, avoiding the situations of overcharging, over discharging, short circuit and over-temperature of the battery. It should be noted that the battery protection module 50 may be an integrated circuit chip, for example CT2105.

Furthermore, the novel intelligent remote controllable battery system provided by the present invention further comprises a speed sensor configured to sense the motion speed, wherein the speed sensor is connected to the data processing module. The speed information detected by the speed sensor is transmitted to the data processing module. After processing, the speed information is further modulated by the modulation-demodulation module. At last, the modulated speed information is transmitted by the antenna. The external remote control device receives and displays the signal, so that the external remote control device may regulate the output voltage of the charging-discharging control module 20 based on the current speed.

Figure 3:
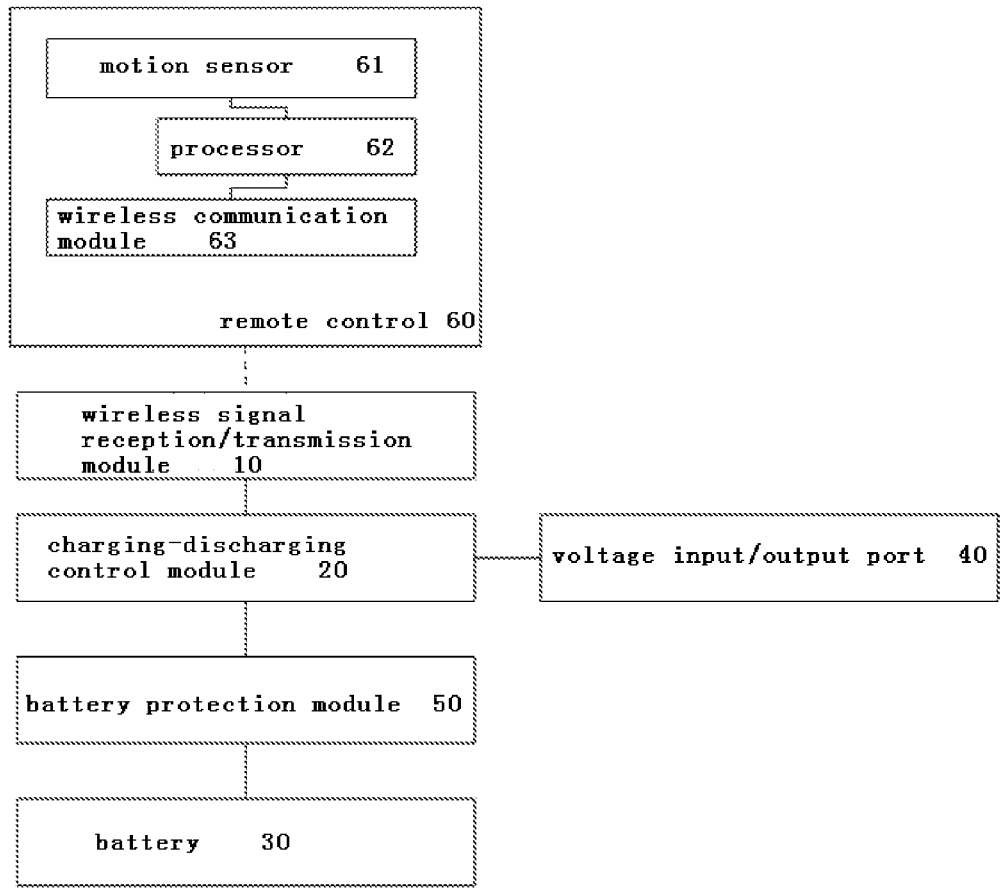
FIG. 3 is a schematic diagram of a novel intelligent remote controllable battery system according to third embodiment of the present invention.

As shown in FIG. 3, the novel intelligent remote controllable battery system according to a third embodiment of the present invention further comprises a remote control 60, wherein the remote control 60 is provided with a motion sensor 61, a processor 62 and a wireless communication module 63 connected together in sequence, wherein the processor 62 transmits a motion data of the motion sensor 61 to the wireless signal reception/transmission module 10 through the wireless communication module 63, wherein the charging-discharging control module 20 outputs a proper voltage to the external electric equipment, such as toy cars, based on the motion data; so that the speed of the toy cars may be regulated by regulating the output voltage.

More specifically, in the novel intelligent remote controllable battery system provided by the present invention, the remote control 60 is further provided with a display module, for example a liquid crystal display screen, wherein the charging-discharging control module 20 is further configured to detect an electric consumption of the battery 30 and transmit the electric consumption to the wireless communication module 63 of the remote control 60 through the wireless signal reception/transmission module 10, wherein the display module is configured to display the electric consumption.

Furthermore, the novel intelligent remote controllable battery system provided by the present invention further comprises a temperature control module including a temperature sensor configured to a temperature of the battery, a heater configured to heat the battery, and a controller, wherein the temperature sensor and the heater is connected to the controller respectively. The temperature control module may prevent the battery 30 from working under an improper low-temperature environment which may result in the abnormal operation of the battery 30.

Figure 4:
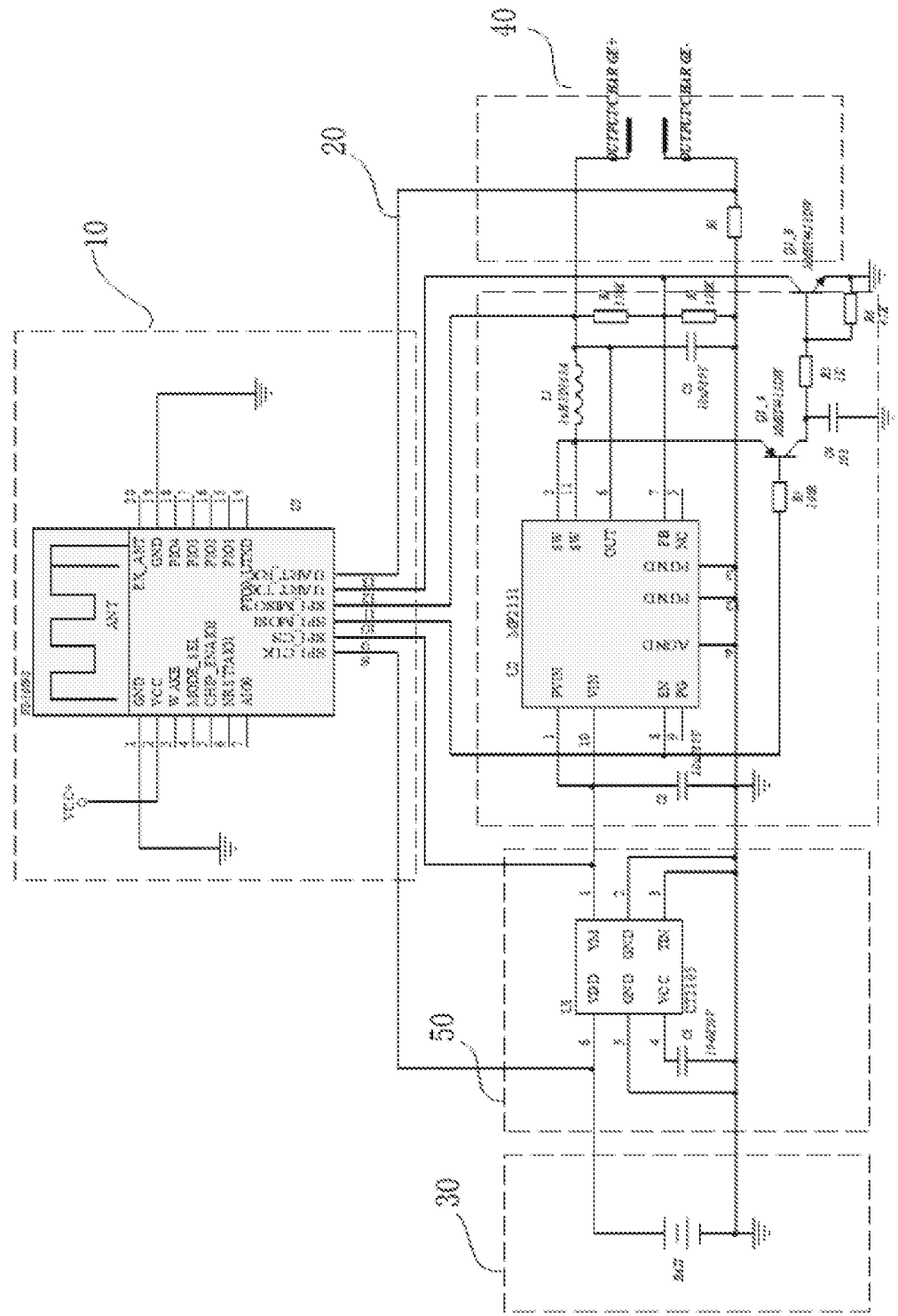
FIG. 4 is a circuit of a preferred embodiment according to the present invention.

As shown in FIG. 4, the detailed circuit diagram of the novel intelligent remote controllable battery system is illustrated. The working process may be as follows: a wireless signal is transmitted by the remote control 60 and receipted by the antenna ANT, and then being transferred to the integrated chip MP2131; the integrated chip MP2131 demodulates the received signal into a modulated signal; after data processing is performed on the modulated signal, the modulated signal becomes a signal recognizable to the charging-discharging control module 20, for example chip MP2131; the I/O ports of the pin PIN11 and pin PIN12 of the integrated chip WI-3009S are configured to control the charging-discharging control module 20, i.e. the enable port EN and the control port FB of the chip MP2131; the control port FB of the chip MP2131 controls the built-in PWM of the chip MP2131 and regulates the duty ratio of the built-in MOSFET switch, so that the output voltage and current may reach the desired voltage and current and therefore the battery energy is converted to desired voltage and current and being output through the battery output charging input port, but also control the turn-on of the built-in MOSFET for receiving an external charging. The enable port EN controls the on or off of the chip MP2131.

The voltage signal on the current sample resister Ri is input to the WI-3009S module through the PIN13 I/O port of the integrated chip WI-3009S, the voltage signal on the voltage sample resister R2 is input to the WI-3009S module through the PIN11 I/O port of the WI-3009S, and the battery voltage signal is input through the I/O ports of the PIN8 and PIN9 of the WI-3009S. After the modulation-demodulation and data processing of the data processing module WI-3009S; after modulation-demodulation and data processing of the data processing module WI-3009S are performed on these signals to obtain a modulated signal, and then the modulated signal is amplified and transmitted out by the antenna ANT.

The foregoing description, for purpose of explanation, has been described with reference to specific embodiments, but are not intended to limit the present invention. It is appreciated that one of ordinary skill in the art may modify the foregoing embodiments or substitute some of technical features of the invention with an equivalent. However, any modification, equivalent or amendment without departing from the spirit and principle of the invention should be deemed as falling within the scope of the invention.

I claim:

1. A remote controllable battery system, comprising a wireless signal reception/transmission module, a charging-discharging control module, a battery and a voltage input/output port,
wherein the wireless signal reception/transmission module is electrically connected to the changing-discharging control module; wherein the battery is electrically connected to the charging-discharging control module; the charging-discharging control module is electrically connected to the voltage input/output port;
wherein the wireless signal reception/transmission module is configured to receive a wireless control signal from an external remote control device,
wherein the charging-discharging control module is configured to convert an output voltage of the battery to a voltage with specific specification based on the wireless control signal; the charging-discharging control module is configured to output the voltage with specific specification to an external electric equipment through the voltage input/output port; and the charging-discharging control module is further configured to convert an input voltage from an external power supply through the voltage input/output port to a specification-predetermined voltage for charging the battery.

2. The battery system of claim 1, further comprising a battery protection module being electrically connected between the battery and the charging-discharging control module.

3. The battery system of claim 2, wherein the battery protection module comprises an overcharge protection unit, an overdischarge protection unit, a short-circuit protection unit and an over-temperature protection unit being connected in sequence.

4. The battery system of claim 1, wherein the wireless signal reception/transmission module includes an antenna, a modulation-demodulation module and a data processing module which are connected in sequence, wherein the data processing module is connected to the charging-discharging control module.

5. The battery system of claim 4, further comprising a speed sensor configured to sense the motion speed.

6. The battery system of claim 5, further comprising a remote control, wherein the remote control is provided with a motion sensor, a processor and a wireless communication module being connected in sequence, wherein the processor transmits a motion data of the motion sensor to the wireless signal reception/transmission module through the wireless communication module, and the charging-discharging control module outputs a corresponding voltage to the external electric equipment based on the motion data.

7. The battery system of claim 6, wherein the the remote control is further provided with a display module; the charging-discharging control module is further configured to detect an electric consumption of the battery and transmit the electric consumption to the wireless communication module of the remote control through the wireless signal reception/transmission module, wherein the display module is configured to display the electric consumption.

8. The battery system of claim 5, further comprising a temperature control module including a temperature sensor configured to a temperature of the battery, a heater configured to heat the battery, and a controller, wherein the temperature sensor and the heater is connected to the controller respectively.

9. A remote controllable battery system, comprising a wireless signal reception/transmission module, a charging-discharging control module, a battery and a voltage input/ output port, wherein the wireless signal reception/transmission module is electrically connected to the changing-discharging control module; wherein the battery is electrically connected to the charging-discharging control module; the charging-discharging control module is electrically connected to the voltage input/output port; the wireless signal reception/transmission module is configured to receive a wireless control signal from an external remote control device; the charging-discharging control module is configured to convert an output voltage of the battery to a voltage with specific specification based on the wireless control signal; the charging-discharging control module is configured to output the voltage with specific specification to an external electric equipment through the voltage input/output port; and the charging-discharging control module is further configured to convert an input voltage from an external power supply through the voltage input/output port to a specification-predetermined voltage for charging the battery, wherein the remote controllable battery system further comprises a battery protection module electrically connected between the battery and the charging-discharging control module, wherein the battery protection module includes an overcharge protection unit, an overdischarge protection unit, a short-circuit protection unit and an over-temperature protection unit being connected in sequence; wherein the wireless signal reception/transmission module includes an antenna, a modulation-demodulation module and a data processing module which are connected in sequence, wherein the data processing module is connected to the charging-discharging control module;

wherein the remote controllable battery system further comprises wherein the remote control is provided with a motion sensor, a processor and a wireless communication module being connected in sequence, wherein the processor transmits a motion data of the motion sensor to the wireless signal reception/transmission module through the wireless communication module, and the charging-discharging control module outputs corresponding voltage to the external electric equipment based on the motion data; wherein the remote control is further provided with a display module; the charging-discharging control module is further configured to detect an electric consumption of the battery and transmit the electric consumption to the wireless communication module of the remote control through the wireless signal reception/transmission module, wherein the display module is configured to display the electric consumption.

\* \* \* \* \*